(12) United States Patent
Campbell

(10) Patent No.: US 8,860,879 B1
(45) Date of Patent: Oct. 14, 2014

(54) SUCTION CUP CAMERA

(75) Inventor: Jeffery R. Campbell, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 30 days.

(21) Appl. No.: 13/603,720

(22) Filed: Sep. 5, 2012

(51) Int. Cl.
*H04N 5/225* (2006.01)

(52) U.S. Cl.
USPC .......................................... 348/373; 348/376

(58) Field of Classification Search
CPC ...................................... H04N 5/2252–5/2253
USPC .................................................. 348/373, 376
See application file for complete search history.

(56) References Cited

U.S. PATENT DOCUMENTS

| | | | |
|---|---|---|---|
| 2003/0058363 A1* | 3/2003 | Boyden et al. | 348/375 |
| 2005/0117052 A1* | 6/2005 | Willes et al. | 348/375 |
| 2007/0242755 A1* | 10/2007 | Ochoa | 375/242 |
| 2011/0052116 A1* | 3/2011 | Boersma | 385/12 |
| 2013/0341412 A1* | 12/2013 | Johnson | 235/492 |
| 2014/0071547 A1* | 3/2014 | O'Neill et al. | 359/827 |

* cited by examiner

*Primary Examiner* — Mekonnen Dagnew
(74) *Attorney, Agent, or Firm* — Christopher P. Maiorana, PC

(57) ABSTRACT

An apparatus comprising a suction cup and a camera. The suction cup has an aperture. The camera is attached to the suction cup such that the camera can capture images through the aperture of the suction cup and a surface to which the suction cup is attached while the suction cup is attached to the surface.

20 Claims, 6 Drawing Sheets

SUCTION CUP CAMERA

FIELD OF THE INVENTION

The present invention relates to digital photography and video capture generally and, more particularly, to a method and/or apparatus for implementing a suction cup camera.

BACKGROUND OF THE INVENTION

Digital video cameras are utilized in homes and businesses for security monitoring. Digital video cameras such as dash cams can also be utilized in vehicles such as police cars. Separate cameras are usually installed in each location to be monitored. When simultaneous monitoring of multiple locations is not needed, the installation of multiple cameras can be an unnecessary expense.

It would be desirable to implement a suction cup camera.

SUMMARY OF THE INVENTION

The present invention concerns an apparatus comprising a suction cup and a camera. The suction cup has an aperture. The camera is attached to the suction cup such that the camera can capture images through the aperture of the suction cup and a surface to which the suction cup is attached while the suction cup is attached to the surface.

The objects, features and advantages of the present invention include providing a suction cup camera that may (i) be removably attached to any smooth surface, (ii) allow placing a camera on any window, (iii) allow viewing through a hotel room door peep sight without standing near the door, (iv) allow moving a dash cam between multiple cars, (v) alert a user if the device falls off a surface, and/or (vi) allow images to be captured through a surface to which the suction cup camera is attached.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
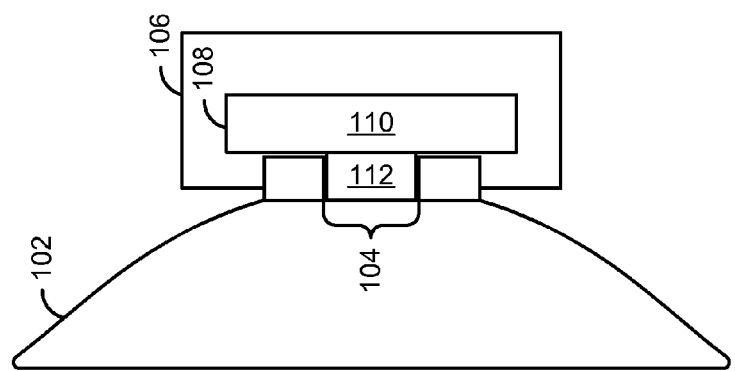
FIG. 1 is a diagram illustrating a suction cup camera in accordance with an embodiment of the present invention.
Figure 1:
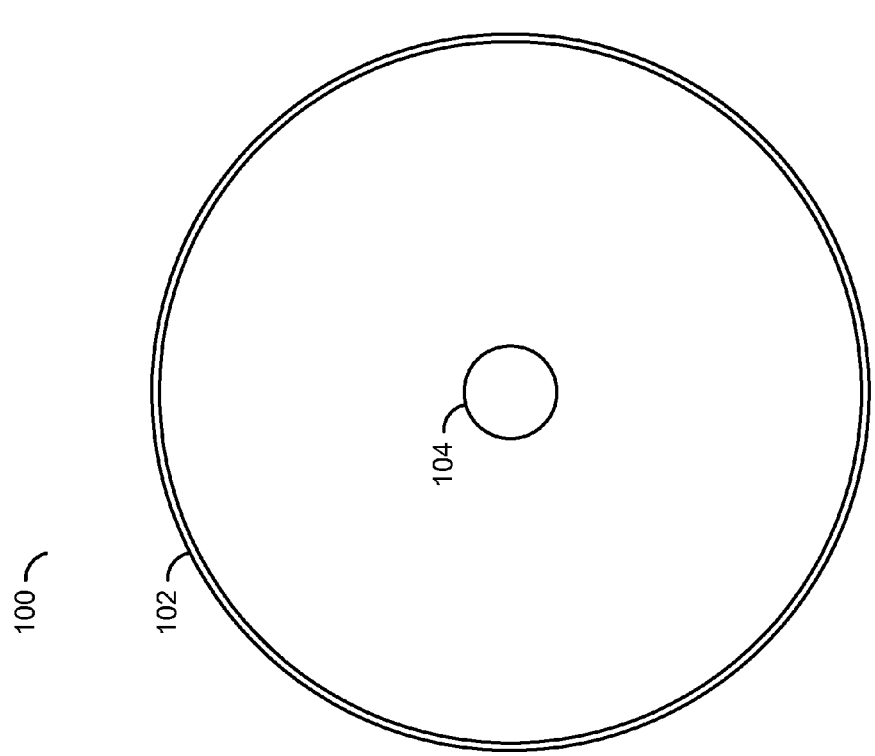

Referring to FIG. 1, a diagram is shown illustrating a suction cup camera 100 in accordance with an embodiment of the present invention. In one example, the suction cup camera 100 may be implemented as a small, compact camera that may be easily attached in any location. In one example, the suction camera 100 may be small enough to fit in the palm of a hand. The suction cup camera 100 may comprise a suction cup 102 with an aperture 104, a housing 106, and a camera 108. The aperture 104 generally passes completely through the back of the suction cup 102. The housing 106 may be attached at a rear side of the suction cup 102. The camera 108 may be disposed within the housing 106. The camera 108 may be attached to the suction cup 102 such that images may be captured through the aperture 104 and a surface to which the suction cup 102 is attached. The housing 106 is structured to allow pressure to be applied for attaching the suction cup 102 to a surface without affecting the camera 108.

The camera 108 generally comprises a body 110 and a lens assembly 112. The body 110 generally comprises electronic and/or mechanical parts (e.g., circuit boards, shutter, actuators, etc.) of the camera 108. The lens assembly 112 generally comprises the optical components (e.g., lens, iris diaphragm, etc.) of the camera. In one example, the lens assembly 112 may be configured to be mounted within the aperture 104 of the suction cup 102 such that camera 108 does not interfere with the suction cup 102 forming a vacuum with the surface to which the suction cup 102 is attached. In general, the suction cup 102 attaches the camera 108 to the surface when a user presses the suction cup 102 against the surface.

The camera 108 may be battery powered and include support for wireless communication by one or more wireless protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20. The camera 108 may also include support for communicating using one or more of the universal serial bus protocols (e.g., USB 1.0, 2.0, 3.0, etc.). The camera 108 may also be configured to be powered via the USB connection. However, other communication and/or power interfaces may be implemented accordingly to meet the design criteria of a particular implementation.

Figure 2:
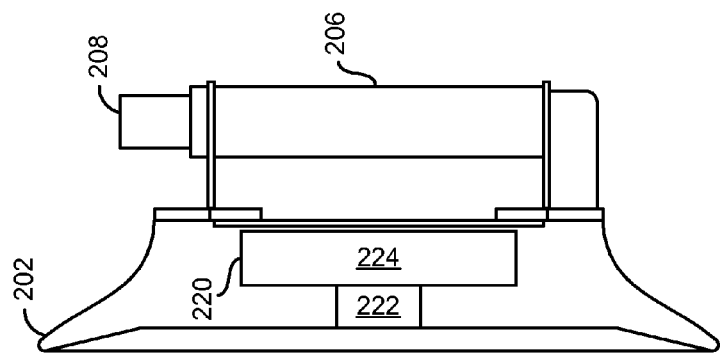
FIG. 2 is a diagram illustrating a suction cup camera in accordance with another embodiment of the present invention.
Figure 2:
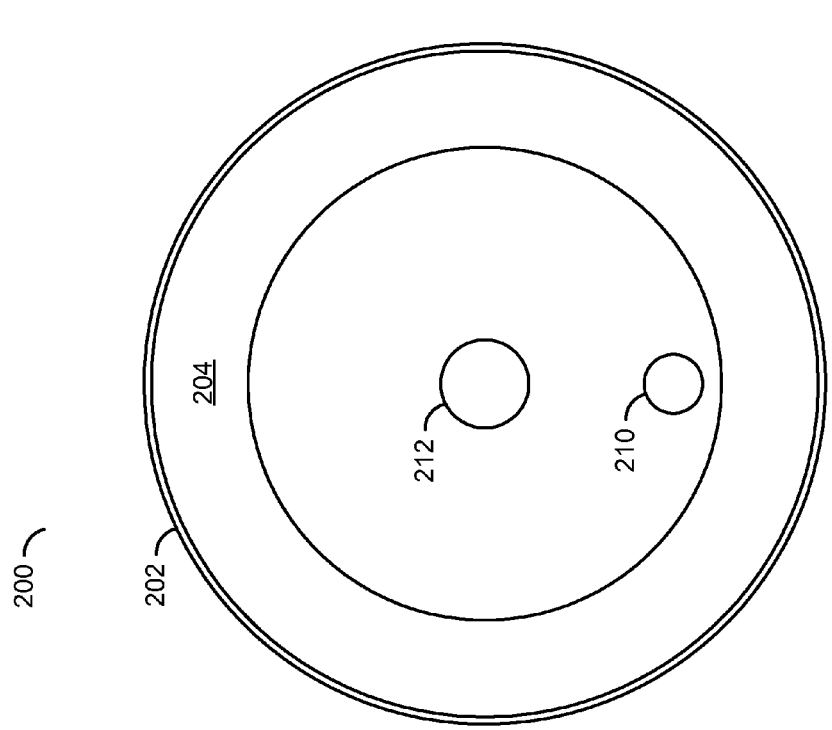

Referring to FIG. 2, a diagram is shown illustrating a suction cup camera 200 in accordance with another embodiment of the present invention. In one example, the suction cup camera 200 may comprise a larger, more robust suction cup camera. For example, the suction cup camera 200 may be utilized in commercial and/or industrial environments. The suction cup camera 200 may comprise a housing 202, a pad 204, and a pump 206. The pad 204 may be formed, in one example, using a rubber material. However, other materials may be used to form the pad 204 to meet the design criteria of a particular implementation. The pump 206 generally includes a plunger 208. The pump 206 may also have a vacuum release valve (not shown). The pump 206 is generally configured to allow a person to attach the suction cup 200 to a surface by holding the pump 206 as a handle and pressing the plunger 208 to create a vacuum between the pad 204 and the surface to which the suction cup camera 200 is to be attached.

The pad 204 generally includes a first aperture 210 and a second aperture 212. The first aperture 210 may be used as an inlet port for the pump 206. The second aperture 212 may be configured to allow attachment of a camera 220 to a rear side of the pad 204 within the housing 202. When the camera 220 is mounted to the pad 204, a lens assembly 222 and the aperture 212 are generally aligned. The camera 220 may be attached such that the camera 220 may capture still and/or video images through the surface to which the suction cup camera 200 is attached.

The camera 220 further includes a body 224 that may comprise a circuit board with the electronics and mechanical components of the camera 220. The camera 220 may be battery powered and include support for wireless communication by one or more wireless protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20. The camera 220 may also include support for communicating using one or more of the universal serial bus protocols (e.g., USB 1.0, 2.0, 3.0, etc.). The camera 220 may also be configured to be powered via the USB connection. However, other communication and/or power interfaces may be implemented accordingly to meet the design criteria of a particular implementation. In one example, connections to the camera 220 may be made using connectors mounted in the housing 202.

Figure 3:
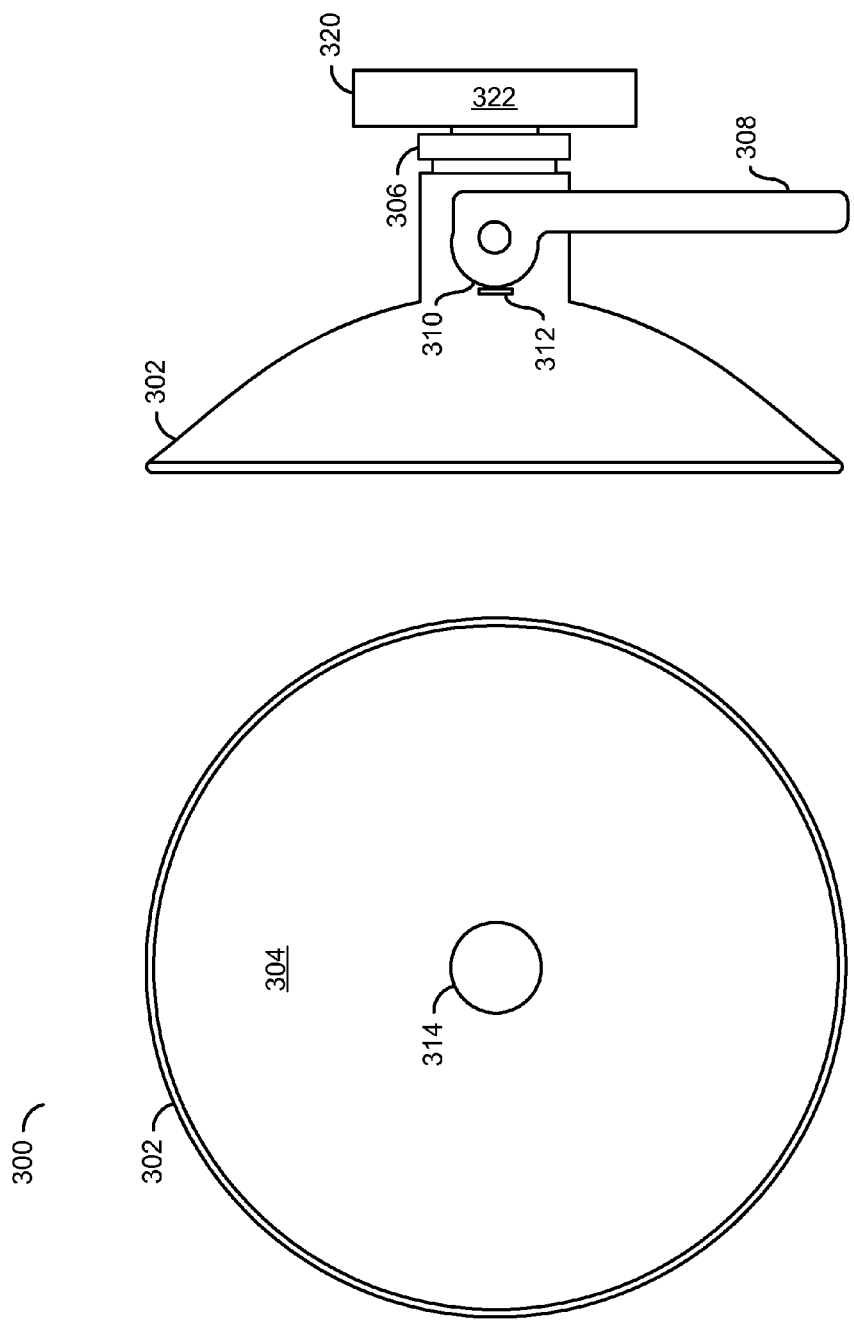
FIG. 3 is a diagram illustrating a suction cup camera in accordance with yet another embodiment of the present invention.

Referring to FIG. 3, a diagram is shown illustrating a suction cup camera 300 in accordance with yet another embodiment of the present invention. In one example, the suction cup camera 300 may comprise a housing 302, a pad 304, an actuator 306, and a lever 308. The pad 304 may be formed, in one example, using a rubber material. However, other materials may be used to implement the pad 304 to meet the design criteria of a particular implementation. The lever 308 generally includes a cam surface 310. The cam surface 310 may be configured to press against a raised structure 312 on a side surface of the housing 302.

As the lever 308 is rotated from being perpendicular to a front edge of the suction cup camera 300 to being parallel to the front edge of the suction cup camera 300, the cam surface 310 and raised structure 312 cause a pivot of the lever 308 to move away from the front surface of the suction cup camera 300. The pivot of the lever 308 is attached to the actuator 306 and the actuator 306 is attached to the pad 304. As the pivot moves away from the front edge of the suction cup camera 300, the actuator 306 and, consequently, the pad 304 are also moved away from the front edge of the suction cup camera 300. With the suction cup camera 300 held against a surface, the movement of the pad 304 away from the front edge of the suction cup camera 300 generally creates a vacuum between the pad 304 and the surface to which the suction cup camera 300 is to be attached. In one example, the lever 308 and the raised structure 312 are duplicated on opposite sides of the housing 302 such that the actuator 306 may move smoothly back and forth to attach and release the suction cup camera 300 from the surface. The two levers 308 may be coupled to one another for ease of use.

The pad 304 may include an aperture 314. The aperture 314 is generally aligned with a passage through the actuator 306. A camera 320 may be attached to a rear portion of the actuator 306 such that a lens assembly of the camera 320 is disposed within the passage through the actuator 306 and aligned with the aperture 314. The camera 320 may be attached such that the camera 320 may capture still and/or video images through a surface to which the suction cup camera 300 is attached. A body 322 of the camera 320 may include a circuit board with the electronics and mechanical components of the camera 320. The camera 320 may be battery powered and include support for wireless communication by one or more wireless protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20. The camera 320 may also include support for communicating using one or more of the universal serial bus protocols (e.g., USB 1.0, 2.0, 3.0, etc.). The camera 320 may also be configured to be powered via the USB connection. However, other communication and/or power interfaces may be implemented accordingly to meet the design criteria of a particular implementation.

Figure 4:
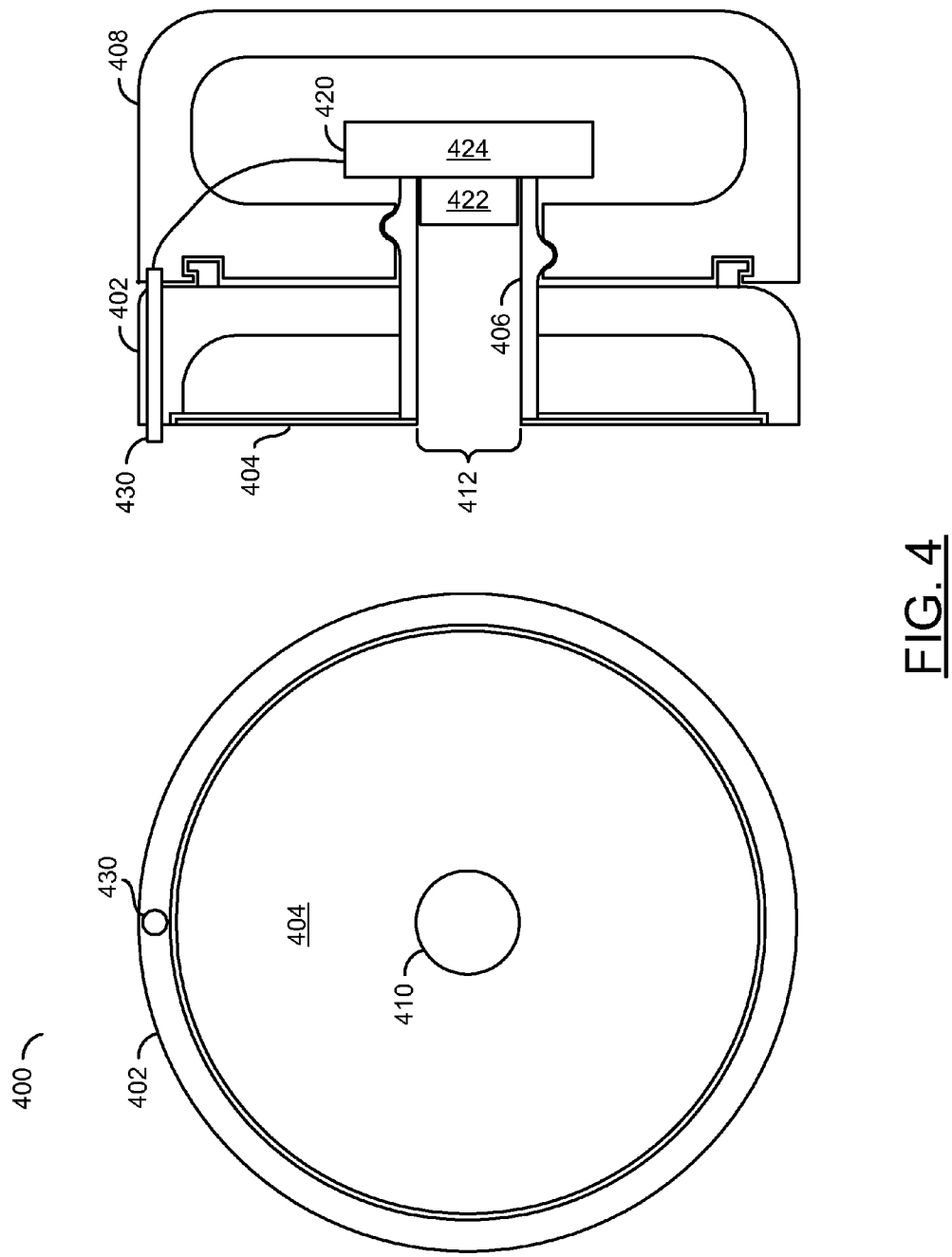
FIG. 4 is a diagram illustrating a suction cup camera in accordance with still another embodiment of the present invention.

Referring to FIG. 4, a diagram is shown illustrating a suction cup camera 400 in accordance with still another embodiment of the present invention. In one example, the suction cup camera 400 may comprise a housing 402, a pad 404, an actuator 406, and a knob 408. In one example, the pad 404 may be made of rubber. However, other materials may be used to form the pad 404 accordingly to meet the design criteria of a particular implementation.

In one example, the suction cup camera 400 may be configured to attach to a surface when the knob 408 is turned in either a clockwise or counter-clockwise direction. The suction cup camera 400 may be further configured to be easily removed from the surface after rotating the knob 408 in the opposite (e.g., counter-clockwise or clockwise) direction. For example, the knob 408 may be engaged with the actuator 406 via a number of threads such that as the knob 408 is rotated in one direction the actuator 406 is moved away from the front edge of the suction cup camera 400 and when the knob 408 is rotated in the opposite direction the actuator 406 is moved toward the front edge of the suction cup camera 400. In one example, the size and number of the threads may be selected to allow attachment of the suction cup camera 400 with less than a full turn (e.g., 30°, 45°, 60°, 90°, etc.) of the knob 408.

The actuator 406 may be attached to the pad 404 such that as the actuator 406 is moved away from the front edge of the suction cup camera 400, the pad 404 is also moved away from the front edge of the suction cup camera 400 and, consequently, away from the surface to which the suction cup camera 400 is to be attached. With the suction cup camera 400 held against the surface, the movement of the pad 404 away from the front edge of the suction cup camera 400 generally creates a vacuum between the pad 404 and the surface to which the suction cup camera 400 is to be attached.

The pad 404 may include an aperture 410. The aperture 410 is generally aligned with a passage 412 through the actuator 406. A camera 420 may be attached to a rear portion of the actuator 406 such that a lens assembly 422 of the camera 420 is disposed within the passage 412 of the actuator 406 and aligned with the aperture 410. The camera 420 may be attached such that the camera 420 may capture still and/or video images through a surface to which the suction cup camera 400 is attached. A body 424 of the camera 420 may include one or more circuit boards with the electronics and mechanical components of the camera 420. The camera 420 may be battery powered and include support for wireless communication by one or more wireless protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20. The camera 420 may also include support for communicating using one or more of the universal serial bus protocols (e.g., USB 1.0, 2.0, 3.0, etc.). The camera 420 may also be configured to be powered via the USB connection. However, other communication and/or power interfaces may be implemented accordingly to meet the design criteria of a particular implementation. In one example, connections to the camera 420 may be made using connectors that may be accessed through openings in the knob 408.

Embodiments of the present invention may also be configured to determined when a device implemented in accordance with the present invention is attached to a surface. For example, with reference to FIG. 4, a sensor 430 may be implemented to detect when a suction cup camera in accordance with the present invention is attached to a surface. In one example, the sensor 430 may be configured to provide a signal or actuate a switch when the associated suction cup camera is attached to the surface. In one example, the signal or switch may be configured to control power to the associated suction cup camera. For example, battery life may be extended by controlling power such that the camera is energized only when attached to a surface. In another example, the signal or switch may be configured to produce a warning or alarm indicating that the associated suction cup camera is no longer attached to the surface. In yet another example, the signal or switch could be configured to switch the associated suction cup camera between an unattended (or automatic) mode and an attended (or user controlled) mode. The sensor 430 may be implemented using, for example, a switch, a mechanical linkage, a proximity detector, a pressure sensor, a sensor configured to detect a change in refractive index, a photovoltaic sensor, or any other appropriate device. Although the sensor 430 is shown in the context of the embodiment illustrated in FIG. 4, it will be apparent to those of ordinary skill in the art that embodiments of the sensor 430 may be implemented for use with the embodiments illustrated in FIGS. 1-3.

Figure 5:
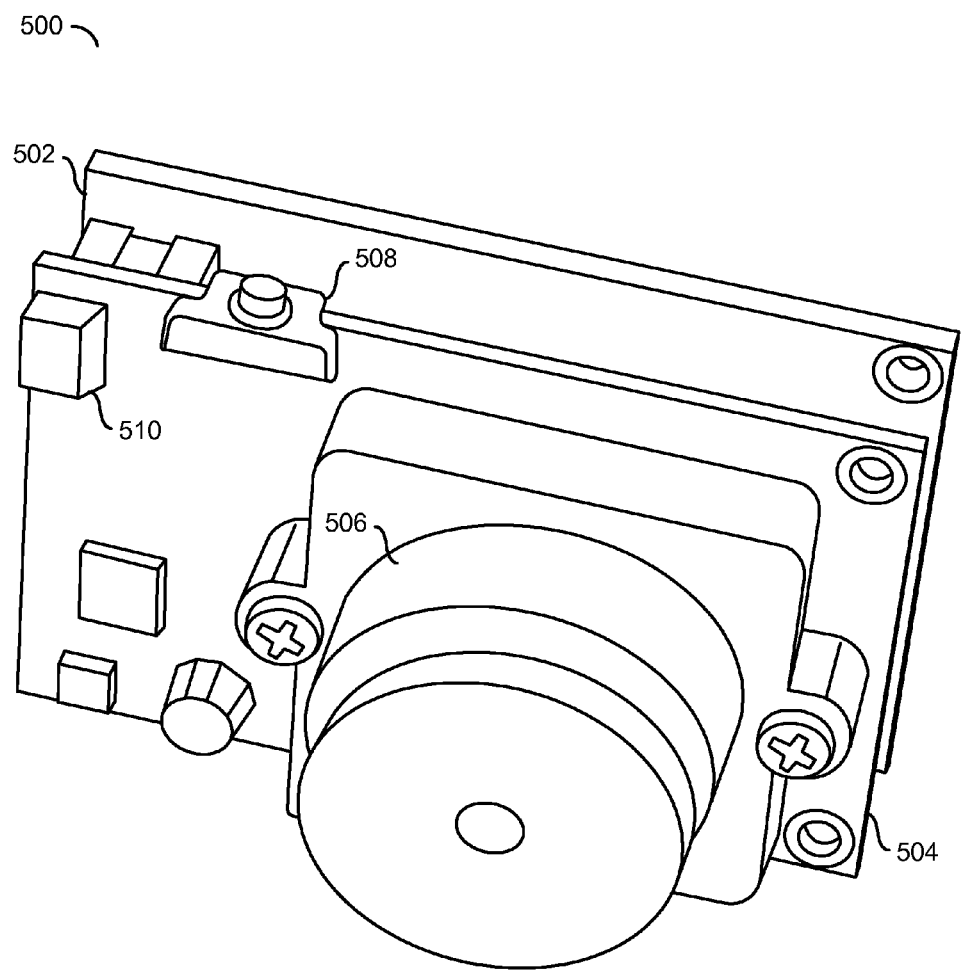
FIG. 5 is a diagram illustrating a camera that may be used to implement a suction cup camera in accordance with an embodiment of the present invention.

Referring to FIG. 5, a diagram is shown illustrating a camera 500 that may be used to implement a suction cup camera in accordance with an embodiment of the present invention. In one example, the camera 500 may be slightly larger than a U.S. quarter dollar coin. The camera 500 may comprise a circuit board 502, a circuit board 504 and a lens assembly 506. The circuit boards 502 and 504 may contain the camera electronics (e.g., embedded processor, digital signal processor(s), memory, communication interfaces (e.g., wired, wireless, etc.), and image sensor (e.g., CCD)). In one example, the lens assembly 506 may implement a pan/tilt/zoom lens. The circuit boards 502 and 504 may contain the features needed to control the pan/tilt/zoom lens. The lens assembly 506 may be mounted to the circuit board 504 in such a manner as to allow the lens assembly 506 to support the weight of the circuit boards when mounted by a suction cup to a surface. In one example, the circuit board 504 may also include a button (or switch) 508 and a connector 510. The button 508 may be configured for taking pictures manually. The connector 510 may be configured to connect the camera 500 to other devices (e.g., a USB connector). However, other camera configurations may be implemented to meet the design criteria of a particular implementation.

Figure 6:
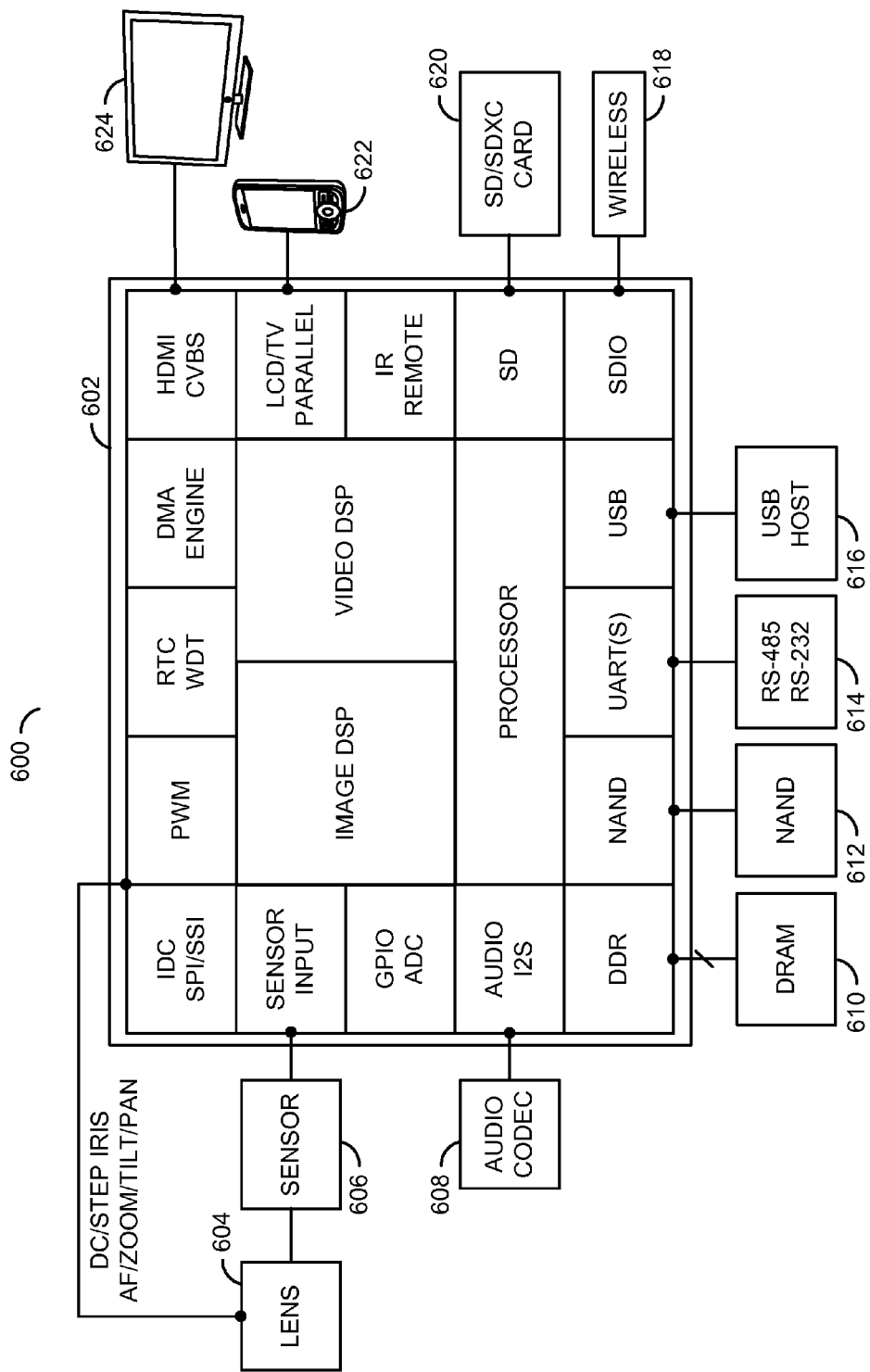
FIG. 6 is a diagram illustrating an example implementation of the camera of FIG. 5.

Referring to FIG. 6, a block diagram is shown illustrating an example implementation of a camera system 600. In one example, the electronics of the camera system 600 may be implement as one or more integrated circuits. For example, an application specific integrated circuit (ASIC) or system on chip (SOC) may be used to implement the camera system 60. In one example, the camera system 600 may comprise a camera chip (or circuit) 602, a lens assembly 604, an image sensor 606, an audio codec 608, dynamic random access memory (DRAM) 610, FLASH memory 612, one or more serial interfaces 614, an interface 616 for connecting to or acting as a USB host, a wireless interface 618, an interface for connecting to a removable media (e.g., SD, SDXC, etc.) 620, an interface for communicating with portable touchscreen device 622, and an interface for communicating with a television 624. The main camera circuit 602 may include a number of modules including a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infra-red (IR) remote interface, a secure digital input output (SDIO) interface module, an SD card interface, an audio I²S interface, an image sensor interface, and a synchronous data communications interface (e.g., IDC SPI/SSI). The circuit 602 may also include an embedded processor (e.g., ARM, etc.), an image digital signal processor (DSP) and a video DSP. The circuit 602 may be configured (programmed) to control the lens assembly 604 and receive image data from the sensor 606.

Embodiments of the present invention generally provide a digital camera that may be attached simply to any surface and capture images through the surface to which the camera is attached. In general, the surfaces to which the camera is attached may be transparent or translucent. The transmission characteristics of the particular surface to which the camera may be attached may be determined by the spectral sensitivity of the particular image sensor implemented. For example, a camera with an infra-red (IR) sensitive sensor may capture images through a surface that is transparent to IR wavelengths, but appears opaque in the visible light spectrum. A suction cup camera in accordance with embodiments of the present invention may (i) be removably attached to any smooth surface, (ii) allow placing a camera on any window, (iii) allow viewing through a hotel room door peep sight without standing near the door, (iv) allow moving a dash cam between multiple cars, (v) alert a user if the device falls off a surface to which the device is attached, and/or (vi) allow images to be captured through the surface to which the suction cup camera is attached.

As used herein, the term "simultaneously" is meant to describe events that share some common time period but the term is not meant to be limited to events that begin at the same point in time, end at the same point in time, or have the same duration. The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a suction cup having an aperture, wherein said aperture passes completely through from a front surface to a back surface of said suction cup; and
   a camera attached to said suction cup at said back surface such that an image sensor of said camera is positioned to capture images through said aperture of said suction cup and a surface to which said suction cup is attached while said suction cup is attached to said surface.

2. The apparatus according to claim 1, further comprising an attachment sensor configured to detect when said suction cup is attached to said surface, wherein said camera is powered up when said apparatus is attached to said surface and powered down when said apparatus is not attached to said surface.

3. The apparatus according to claim 2, wherein said apparatus is configured to alert a user when the apparatus is detached from said surface.

4. The apparatus according to claim 2, wherein said attachment sensor comprises a pressure switch.

5. The apparatus according to claim 2, wherein said attachment sensor comprises a plunger configured to activate a switch when said apparatus is attached to said surface.

6. The apparatus according to claim 2, wherein said attachment sensor is configured to detect a change in a refractive index when said apparatus is attached to said surface.

7. The apparatus according to claim 1, wherein said suction cup is configured to attach to said surface by deforming under pressure to form a vacuum between said suction cup and said surface.

8. The apparatus according to claim 1, further comprising a pump configured to produce a vacuum between said suction cup and said surface, wherein said vacuum holds said apparatus to said surface.

9. The apparatus according to claim 1, further comprising a lever configured to produce a vacuum between said suction cup and said surface, wherein said vacuum holds said apparatus to said surface.

10. The apparatus according to claim 1, further comprising a knob configured to produce a vacuum between said suction cup and said surface when rotated, wherein said vacuum holds said apparatus to said surface.

11. The apparatus according to claim 1, wherein said camera can capture at least one of still pictures and video pictures.

12. The apparatus according to claim 1, wherein said camera can capture both still and video pictures.

13. The apparatus according to claim 1, wherein said camera comprises an embedded pan-tilt-zoom lens.

14. The apparatus according to claim 13, wherein said camera further comprises an embedded motor system configured to control said embedded pan-tilt-zoom lens.

15. The apparatus according to claim 1, wherein said camera is configured to communicate using one or more wireless protocols.

16. The apparatus according to claim 15, wherein said one or more wireless protocols comprise one or more of BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, and IEEE 802.20.

17. The apparatus according to claim 1, wherein said camera is configured to communicate using a universal serial bus protocol.

18. The apparatus according to claim 1, wherein a lens assembly of said camera is mounted within said aperture of said suction cup such that said camera does not interfere with formation of a vacuum between said suction cup and said surface to which said suction cup is attached.

19. The apparatus according to claim 1, further comprising an actuator configured to attach said suction cup to and release said suction from said surface.

20. The apparatus according to claim 1, wherein said surface has a transparent or translucent aperture and said apparatus is configured to align said camera with said aperture in said surface.

* * * * *